(12) United States Patent  
Hasky

(10) Patent No.: US 9,323,072 B2  
(45) Date of Patent: Apr. 26, 2016

(54) GLASSES SUPPORT DEVICE AND SYSTEM

(76) Inventor: Shaul Hasky, Yokneam (IL)

( * ) Notice: Subject to any disclaimer, the term of this patent is extended or adjusted under 35 U.S.C. 154(b) by 30 days.

(21) Appl. No.: 13/506,481

(22) Filed: Apr. 23, 2012

(65) Prior Publication Data

US 2013/0278885 A1    Oct. 24, 2013

(51) Int. Cl.
*G02C 3/00* (2006.01)

(52) U.S. Cl.
CPC ........................................ *G02C 3/003* (2013.01)

(58) Field of Classification Search
USPC ......... 351/155, 136, 137, 138, 121, 123, 158, 351/41, 71, 76, 78, 79, 80
See application file for complete search history.

(56) References Cited

U.S. PATENT DOCUMENTS

| | | | | |
|---|---|---|---|---|
| 412,442 | A | * | 10/1889 | Wells .............................. 351/79 |
| 2,478,921 | A | * | 8/1949 | Hansen ........................... 351/71 |
| 3,503,676 | A | * | 3/1970 | O'Neill .......................... 351/123 |
| 3,758,202 | A | * | 9/1973 | Chunga, Sr. .................... 351/41 |
| 3,832,043 | A | * | 8/1974 | Usdan ............................ 351/123 |
| 3,955,885 | A | * | 5/1976 | Aronsohn ....................... 351/155 |
| 5,666,182 | A | * | 9/1997 | Donner .......................... 351/155 |
| 7,011,406 | B1 | * | 3/2006 | Kim ............................... 351/123 |

* cited by examiner

*Primary Examiner* — Hung Dang

(57) ABSTRACT

A bridge-mounted support and support pads are disclosed that enable a patient after nose surgery or nose injury, wearing eyeglasses such that the glasses do not touch the nose, yet the optical centers of the lenses of the eyeglasses are aligned with the centers of the corresponding pupils of patient's eyes. Instead of being supported by the nose pads resting on nose, eyeglasses are supported by cheek pads of bridge-mounted support or support pads, each resting on the corresponding cheek. Eyeglasses are pushed forwards, away from the face of patient such that it does not touch the nose. Bridge-mounted is made of resilient metal wire having: a fold to attaché it to the bridge of the glasses, frame pads to attach it to the frame of the glasses, and soft cheek pads. Support pads are blocks of rubber foam glued to the lenses of eyeglasses.

7 Claims, 4 Drawing Sheets

GLASSES SUPPORT DEVICE AND SYSTEM

FIELD OF THE INVENTION

Embodiments of the present invention relate to devices enabling using spectacles after nose surgery or nose injury.

BACKGROUND

After cosmetic or medically indicated nose surgery, or after nose injury it may be advised by the treating physician to avoid any contact or pressure on the nose until it heals. This period may last up to three months. During this time, the patient may not use conventional eyeglasses as their nose pads and bridge, designed to keep them in place, are designed to be supported by the nose. The pressure applied by the nose pads and bridge to the nose may retard tissue healing, cause pain. Additionally, wound dressing on the nose may make it impossible to set the spectacles in their normal positions.

Not being able to wear glasses may prevent a person with vision impairment from performing daily routine such as reading, driving etc. Not being able to wear sunglasses may cause inconvenient outdoors even if contact lenses are used.

Some patients attempt to use admissive tape attached to the bridge of the glasses and glued to the forehead to keep the glasses above their normal position and away from the nose. This method causes the optical centers of corrective glasses to be positioned above the eye pupils, causing optical distortion, reduced visual acuity and displacement of the image. Additionally, adhesive tape is uncomfortable, may cause skin irritation, and needs to be frequently replaced. When used with sunglasses, sunlight may be reflected from the cheeks which are exposed below the raised sunglasses, causing glare.

US Application 2006082723, titled "Eyeglasses with alternative supports", discloses eyeglasses, with alternative supports for maintaining the bridge of the glasses off the nasal bone or other parts of the bridge, useful for patients of rhinoplasty. The application suggest that the bridge of a conventional eyeglass frame is replaced with an extended bridge support member.

Accordingly, there is therefore a need for a simple device that would allow a patient after nose surgery or injury to use eyeglasses comfortably and without compromising his or her vision.

SUMMARY OF THE EMBODIMENTS

It is an objective of the current invention to provide a bridge-mounted support and support pads that enable a patient after nose surgery or nose injury, wearing eyeglasses such that the glasses do not touch the nose, yet the optical centers of the lenses of the eyeglasses are aligned with the centers of the corresponding pupils of patient's eyes. Instead of being supported by the nose pads resting on nose, eyeglasses are supported by cheek pads of bridge-mounted support or support pads, each resting on the corresponding cheek. Eyeglasses are pushed forwards, away from the face of patient such that it does not touch the nose. Bridge-mounted is made of resilient metal wire having: a fold to attaché it to the bridge of the glasses, frame pads to attach it to the frame of the glasses, and soft cheek pads. Support pads are blocks of rubber foam glued to the lenses of eyeglasses.

According to an examplary embodiment of the current invention, a support is discloses, for enabling a patient after nose surgery or nose injury to wear conventional eyeglasses such that the glasses do not touch the nose, yet the optical centers of the lenses of the eyeglasses are aligned with the corresponding pupils of the patient, comprising: two cheek pads attached to conventional eyeglasses and capable of resting on the cheeks of the patient wearing said eyeglasses, wherein said cheek pads push said eyeglasses forwards away from the face of said patient such that said eyeglasses does not touch the nose of said patient, and the optical centers of the lenses of said eyeglasses are aligned with the corresponding pupils of said patient.

In an examplary embodiment the support comprises a resilient wire bent to create a fold capable of attaching to the bridge of said eyeglasses; two frame pads attached to said wire and capable of securing said wire to the frame of said eyeglasses, wherein said two cheek pads are attached to said wire.

In some examplary embodiments the resilient wire is made of metal. In some examplary embodiments the metal is stainless steel. In some examplary embodiments the metal is Nitinol.

In some examplary embodiments the two cheek pads are made of silicon rubber. In some examplary embodiments the two cheek pads are clear silicon rubber cylinder having a central bore, into which the wire is inserted.

In some examplary embodiments installing the support onto said eyeglasses comprises: squeezing the two cheek pads toward each other; inserting fold over the bridge of eyeglasses; letting go cheek pads, such that said wire springs out, causing said frame supports to push against the lower rim of the frame and secure the support to said frame. This force is exerted by the resilient wire attempting to return to its original state.

In another examplary embodiment the support comprises two support pads, wherein each of said support pads is glued to a corresponding lens of said eyeglasses.

In some examplary embodiments each of said two support pads comprises a block made of soft material.

In some examplary embodiments said blocks are made of foam rubber.

In another examplary embodiment of the current invention, two support pads are glued to said lenses, for example using dual-sided adhesive tape. This embodiment may be preferred for using with eyeglasses with large lenses, for example sunglasses. In such glasses, the lower part of each lens provide space to glue the support pads without severely interfering with the patient's vision.

In some examplary embodiments each of said two support pads further comprises a frame rest, wherein each of said support pad is glued to said corresponding lens such that said frame rest is against the bottom of said frame.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments of the present invention only, and are presented in the cause of providing what is believed to be the most useful and readily understood description of the principles and conceptual aspects of embodiments of the invention. In this regard, no attempt is made to show structural details in more detail than is necessary for a fundamental understanding of the embodiments; the description taken with the drawings making apparent to those skilled in the art how the several forms of the invention may be embodied in practice. In the accompanying drawings.

DESCRIPTION OF SELECTED EMBODIMENTS

Figure 1:
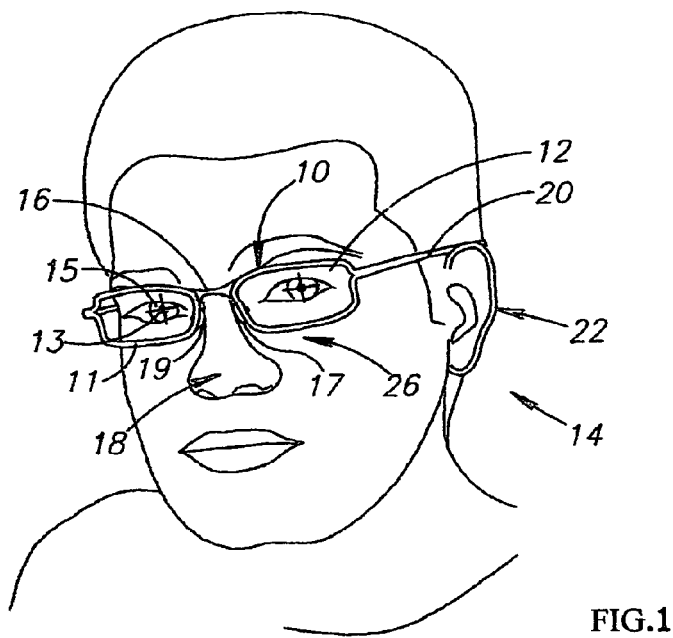
FIG. 1 schematically depicts a user wearing eyeglasses as known in the art.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In discussion of the various figures described herein below, like numbers refer to like parts. For clarity, non-essential elements may have been omitted from some of the drawings.

It should be understood that the various embodiments are not limited to the arrangements and instrumentality shown in the drawings. For drawings clarity, symmetrical elements may have been marked only once.

FIG. 1 schematically depicts a user wearing eyeglasses as known in the art.

User 14 places eyeglasses 10 such that nose pads 17 which are connected to frame 11 rest on his nose 18, and the arms 20 rest on his ears 22. Typically, there is contact point 19 between the nose pads 17 and nose 18. In this position, bridge 16 is near, or even touching the top of the nose 18, and the bottoms of frame 11 is near or even touching cheeks 26 of user 14. In case that eyeglasses 10 is fitted with optical lenses 12, lenses 12 are set in the frame 11 such that their optical centers 13 are aligned with the centers of the corresponding pupils 15 of user's eyes.

Figure 2:
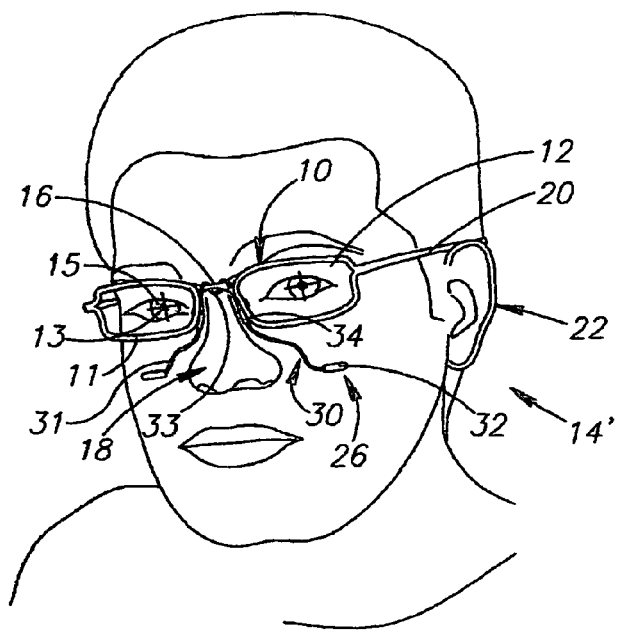
FIG. 2 schematically depicts a patient wearing eyeglasses using bridge-mounted glasses support device according to an exemplary embodiment of the current invention.

FIG. 2 schematically depicts a patient wearing eyeglasses using bridge-mounted glasses support device according to an exemplary embodiment of the current invention.

It is the goal of bridge-mounted support 30 to enable patient 14' to wear eyeglasses 10 such that it does not touch the nose 18, yet the optical centers 13 are aligned with the centers of the corresponding pupils 15 of user's eyes. Instead of being supported by the nose pads resting on nose 18, eyeglasses 10 are supported by cheek pads 32 of bridge-mounted support 30, each resting on the corresponding cheek 26. Eyeglasses 10 which is now supported by arms 20 resting on ears 22, and bridge-mounted support 34, is pushed forwards away from the face of patient 14' such that it does not touch the nose 18.

Bridge-mounted support 30, which is further detailed in FIGS. 3A-D, is made of resilient bent wire 31 having fold 33, frame supports 34 and cheek pads 32.

To use bridge-mounted support 30, patient 14' attaches bridge-mounted support 30 to the frame 11 of eyeglasses 10 by inserting fold 33 over the bridge 10 of frame 11, and ensures that the two frame supports 34 are held against the corresponding bottoms of frame 11. This can be done by squeezing the two cheek pads 32 toward each other, inserting bridge 16 in fold 33, and letting go cheek pads 32 such that wire 31 springs out (as depicted by bold arrows 36), causing frame supports 34 to push against the frame (as depicted by bold arrows 38), and fold 33 to push against bridge 16 (as depicted by bold arrows 37), thus securing bridge-mounted support 30 to eyeglasses 10.

When patient 14' wears eyeglasses 10 fitted with bridge-mounted support 30, eyeglasses 10 are supported by cheek pads 32 of bridge-mounted support 30, each resting on the corresponding cheek 26 and by arms 20 resting on ears 22 such that eyeglasses 10 are positioned forwards, away from the face of patient 14' such that it does not touch the nose 18, yet the optical centers 13 are aligned with the centers of the corresponding pupils 15 of user's eyes.

Figure 3A:
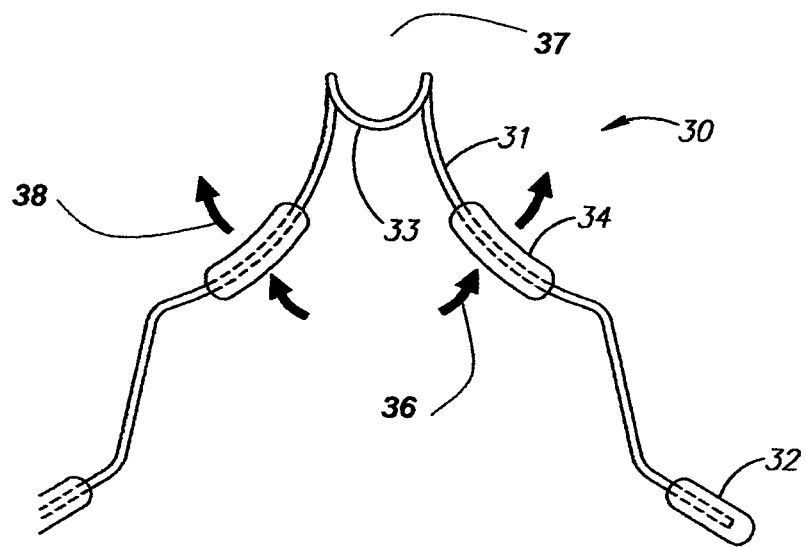
FIG. 3A schematically depicts a front view of a bridge-mounted support device according to an exemplary embodiment of the current invention.

FIG. 3A schematically depicts a front view of a bridge-mounted support device according to an exemplary embodiment of the current invention.

Figure 3B:
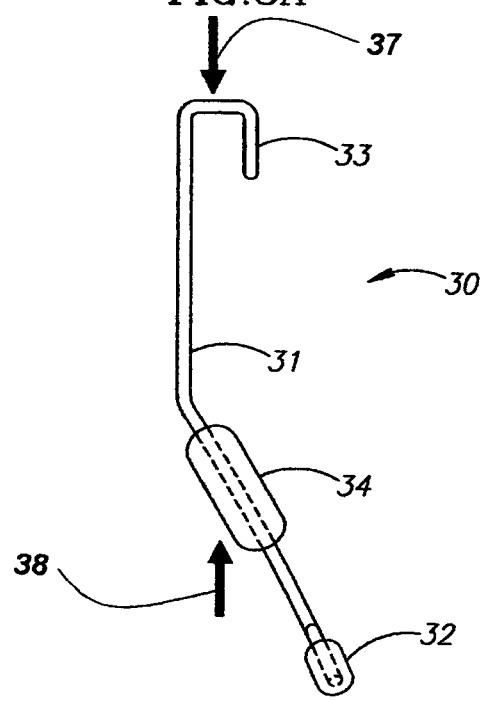
FIG. 3B schematically depicts a side view of a bridge-mounted support device according to an exemplary embodiment of the current invention.

FIG. 3B schematically depicts a side view of a bridge-mounted support device according to an exemplary embodiment of the current invention.

Figure 3C:
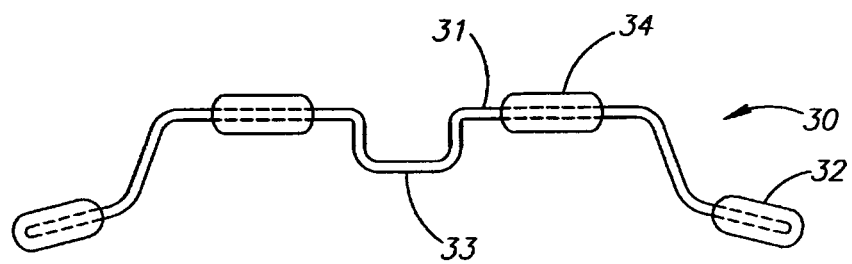
FIG. 3C schematically depicts a top view of a bridge-mounted support device according to an exemplary embodiment of the current invention.

FIG. 3C schematically depicts a top view of a bridge-mounted support device according to an exemplary embodiment of the current invention.

Figure 3D:
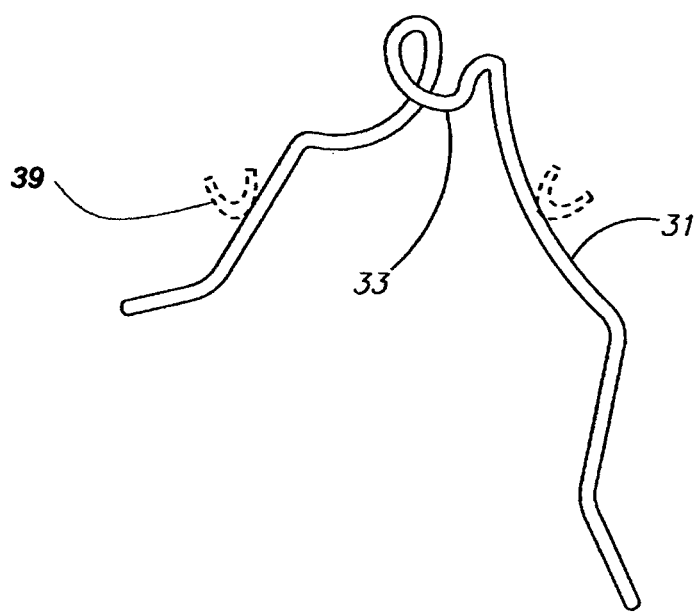
FIG. 3D schematically depicts a 3D view of the naked wire used for a bridge-mounted support device according to an exemplary embodiment of the current invention.

FIG. 3D schematically depicts a 3D view of the naked wire used for a bridge-mounted support device according to an exemplary embodiment of the current invention.

Wire 31 used in bridge-mounted support device 30 may be a thin metallic wire, for example (but limited to) 1 mm diameter stainless steel wire. Other metals, for example Nickel titanium alloy, known as Nitinol, which exhibits shape may be used. Optionally, non metallic bridge-mounted support device 30 may be constructed and is within the general scope of the current invention.

Cheek pads 32 are preferably made of soft material such as silicon rubber, soft polymer or foam. In the depicted exemplary embodiment, each cheek pad 32 is a clear silicon rubber cylinder having a central bore, into which wire 31 is inserted.

Frame supports 34 may be made of soft material such as silicon rubber, soft polymer or foam. In the depicted exemplary embodiment, each frame supports 34 is a clear silicon rubber structure shaped to securely hold frame 11, and having a bore, into which wire 31 is inserted. Alternatively, frame supports 34 may be made of rigid plastic material. Alternatively, frame supports 34 may be a fold (not see in these figures) in wire 31 shaped to securely hold frame 11. It should be noted that frame supports 34 may rest directly against the lenses of eyeglasses 10 when a "frameless" glasses construction are used.

Optionally wire 33, frame pads 43 and/or cheek pad 32 may be supplied having colors to match the skin color or the color of frame 11.

Optionally, frame pads 43 are replaced by optional frame holders 39 (schematically depicted by dashed lines). Frame holders 39 may be made of metal, similar or identical to wire 31 and be welded to wire 31. Alternatively, wire 31 may be bent to form a kink that may hold frame 11 in the same manner as frame pads 34 or frame holders 39.

It should be noted that bridge-mounted support device 30 may be removed from one pair of eyeglasses and remount on another. Thus, a patient may use the same bridge-mounted support device 30 for several pairs of eyeglasses such as reading glasses, sunglasses and outdoor glasses if needed. It also should be noted that bridge-mounted support device 30 requires no modification to the eyeglasses and may be removed when not needed without damaging the eyeglasses. In contrast to the device disclosed in US Application 2006082723, the device according to the exemplary embodiment of the current invention is easily installed and removed by the user without needing any tools.

Figure 4:
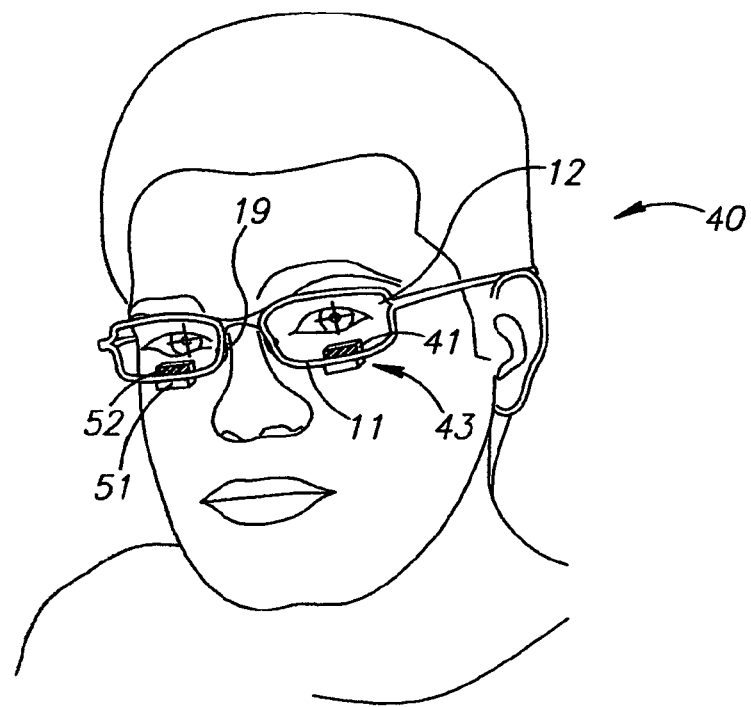
FIG. 4 schematically depicts a patient wearing eyeglasses using glued glasses support according to another exemplary embodiment of the current invention.

FIG. 4 schematically depicts a patient wearing eyeglasses using glued glasses support according to another exemplary embodiment of the current invention.

For drawing clarity, some elements already marked and explained in previous figures were not marked in this figure.

It is the goal of glued glasses support 40 to enable patient 14' to wear eyeglasses 10 such that it does not touch the nose 18, yet the optical centers 13 are aligned with the centers of the corresponding pupils 15 of user's eyes. Instead of being supported by the nose pads resting on nose 18, eyeglasses 10 are supported by two support pads 43, each glued to a corresponding lens 12, and each resting on the corresponding cheek 26. Eyeglasses 10 which is now supported by arms 20 resting on ears 22, and support pads 43, is pushed forwards away from the face of patient 14' such that it does not touch the nose 18.

Figure 5A:
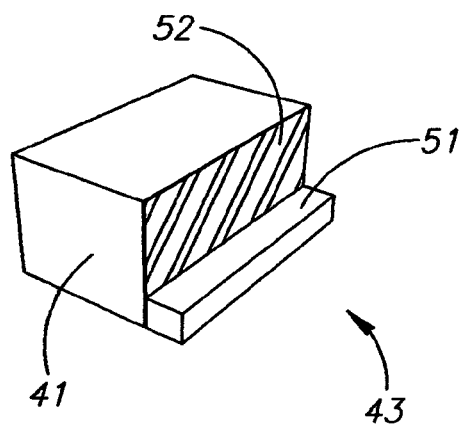
FIG. 5A schematically depicts an isometric 3D view of a support pad according to an exemplary embodiment of the current invention.
Figure 5B:
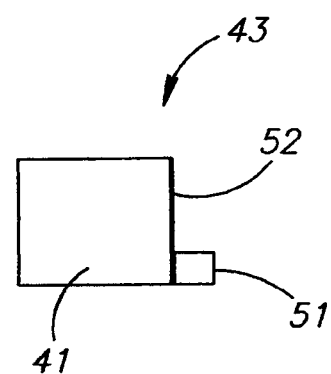
FIG. 5B schematically depicts a side view of a support pad according to an exemplary embodiment of the current invention.

Each support pads 43, which is further detailed in FIGS. 5A-B, is made of soft material such as rubber foam which is glued 52 to the corresponding lens 12 of eyeglasses 10 near the bottom of frame 11.

FIG. 5A schematically depicts an isometric 3D view of a support pad according to an exemplary embodiment of the current invention.

FIG. 5B schematically depicts a side view of a support pad according to an exemplary embodiment of the current invention.

Support pad 43 comprises a small block 41 acting as cheek pads. Blocks (cheek pads) 41 are made of, (or covered on the surface facing the patient with) soft material such as silicon rubber or foam, which is glued to the inner surface of lens 12. Gluing may be done by applying glue, or by having a dual-sided adhesive tape 52 affixed to one of the surfaces of block 41. For example block 41 may be (but not limited to) 18 by 15 by 12 mm in size.

Optionally, support pad 43 may further comprise a frame rest 51. Preferably, support pad 43 is glued to lens 12 such that frame rest 51 is against the bottom of frame 11 as seen in FIG. 4. Optional frame rest 51 may be made of the same material as block 41. For example block 41 may be (but not limited to) 18 by 3 by 3 mm in size.

It should be noted that support pad 43 may be manufactured as one piece integrating block 41 and frame support 51. Alternatively, frame support 51 is glued to block 41, for example using dual-sided adhesive tape 52.

It should be noted that support pad 43 may be used with "frameless" eyeglasses.

Optionally support pad 43 may be supplied having colors to match the skin color or the color of frame 11.

It should be noted support pad 43 are very cheap to manufacture and a pair could be purchased for each of several pairs of eyeglasses such as reading glasses, sunglasses and outdoor glasses if needed. It also should be noted installing support pad 43 requires no modification to the eyeglasses. Preferably, glue or adhesive 52 is such that support pad 43 and may be removed when not needed without damaging the eyeglasses.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A support device for enabling a patient after nose surgery or nose injury to wear conventional eyeglasses such that the glasses do not touch the nose, yet the optical centers of the lenses of the eyeglasses are aligned with the corresponding pupils of the patient, comprising:
   a resilient wire bent to create a fold capable of being removably attached and detached to the bridge of conventional eyeglasses;
   two frame pads attached to said wire and capable of securing said wire to the frame of said eyeglasses;
   two cheek pads, attached to said wire, and capable of resting on the cheeks of the patient wearing said eyeglasses,
   wherein said cheek pads push said eyeglasses forwards away from the face of said patient such that said eyeglasses does not touch the nose of said patient, and the optical centers of the lenses of said eyeglasses are aligned with the corresponding pupils of said patient.

2. The support device of claim 1, wherein said resilient wire is made of metal.

3. The support device of claim 2, wherein the metal is stainless steel.

4. The support device of claim 2, wherein the metal is Nitinol.

5. The support device of claim 1, wherein said two cheek pads are made of silicon rubber.

6. The support of device claim 5, wherein said two cheek pads are clear silicon rubber cylinder having a central bore, into which said wire is inserted.

7. The support of device claim 1, wherein installing the support onto said eyeglasses comprises:
   squeezing the two cheek pads toward each other;
   inserting fold over the bridge of eyeglasses;
   letting go cheek pads, such that said wire springs out, causing said frame supports to push against said frame and secure the support to said frame.

* * * * *